(12) United States Patent (10) Patent No.: US 8,430,216 B2
Fujino et al. (45) Date of Patent: Apr. 30, 2013

(54) BRAKE DEVICE LUBRICATION DEVICE AND METHOD FOR CONTROLLING SAME

(75) Inventors: Taneaki Fujino, Komatsu (JP); Atsushi Sasada, Komatsu (JP); Kenjiro Shimada, Komatsu (JP)

(73) Assignee: Komatsu Ltd., Tokyo (JP)

( * ) Notice: Subject to any disclaimer, the term of this patent is extended or adjusted under 35 U.S.C. 154(b) by 218 days.

(21) Appl. No.: 13/127,339

(22) PCT Filed: Dec. 8, 2009

(86) PCT No.: PCT/JP2009/070508
§ 371 (c)(1),
(2), (4) Date: May 3, 2011

(87) PCT Pub. No.: WO2010/071047
PCT Pub. Date: Jun. 24, 2010

(65) Prior Publication Data
US 2011/0214952 A1 Sep. 8, 2011

(30) Foreign Application Priority Data
Dec. 16, 2008 (JP) ................................ 2008-319452

(51) Int. Cl.
*F16D 65/78* (2006.01)
*F16D 13/74* (2006.01)

(52) U.S. Cl.
USPC ................ 188/264 B; 188/264 F; 188/264 P; 192/70.12; 192/113.3

(58) Field of Classification Search .............. 188/264 B, 188/264 D, 264 F; 192/12 C, 12 D, 12 R, 192/192/13 R, 70.12, 85.61, 113.1, 113.3, 192/113.34, 113.5
See application file for complete search history.

(56) References Cited

U.S. PATENT DOCUMENTS

| 5,573,473 A * | 11/1996 | Asayama et al. ............... 477/63 |
| 8,042,672 B2 * | 10/2011 | Grethel et al. ........... 192/48.611 |
| 2005/0173975 A1 * | 8/2005 | Catalano ......................... 303/10 |
| 2009/0143949 A1 * | 6/2009 | Fukaya et al. ................... 701/67 |
| 2009/0308709 A1 * | 12/2009 | Haupt ........................... 192/221 |

FOREIGN PATENT DOCUMENTS

| JP | 53-34054 A | 3/1978 |
| JP | 4-87864 A | 3/1992 |
| JP | 4-71829 U | 6/1992 |
| JP | 6-3228 B2 | 1/1994 |
| JP | 07-501128 A | 2/1995 |
| JP | 2003-172439 A | 6/2003 |
| JP | 2006-341636 A | 12/2006 |

* cited by examiner

*Primary Examiner* — Christopher Schwartz
(74) *Attorney, Agent, or Firm* — Global IP Counselors, LLP

(57) ABSTRACT

A brake device lubrication device includes a lubricant supply unit and a control unit. The control unit includes a braking timer, a release timer and a storage unit. The control unit is configured to control the lubricant supply unit so as to supply a predetermined first supply amount of lubricant to a brake device when the brake device is in a braking state, to acquire a delay time corresponding to a braking time counted by the braking timer from a relationship of correspondence between the braking time and the delay time stored by the storage unit when the brake device is switched from the braking state to a released state, and to switch a supply amount of lubricant from the first supply amount to a second supply amount which is smaller than the first supply amount when the release time counted by the release timer reaches the acquired delay time.

4 Claims, 7 Drawing Sheets

US 8,430,216 B2

BRAKE DEVICE LUBRICATION DEVICE AND METHOD FOR CONTROLLING SAME

CROSS-REFERENCE TO RELATED APPLICATIONS

This national phase application claims priority to Japanese Patent Application No. 2008-319452 filed on Dec. 16, 2008. The entire disclosure of Japanese Patent Application No. 2008-319452 is hereby incorporated herein by reference.

TECHNICAL FIELD

The present invention relates to a brake device lubrication device and to a method for controlling the same.

BACKGROUND ART

In a brake device, braking force is generated by the pressing together of a rotating member which rotates together with an output shaft, and a fixed member which is fixed to the vehicle body side, and friction generates heat in the rotating member. A lubrication device therefore cools the rotating member by feeding lubricant between the rotating member and the fixed member, and keeps the temperature of the rotating member from increasing.

Even if the brake device is in a released state in which the rotating member and the fixed member are not pressed together, in a case in which a large amount of lubricant is present between the rotating member and the fixed member, A loss of driving force may occur due to a portion of the driving force of the output shaft being transmitted from the rotating member to the lubricant.

In order to prevent such a loss of driving force, in the technique described in Japanese Unexamined Patent Application Publication No. 53-034054, a lubricant circuit is provided for increasing the supply amount of lubricant in a case in which the brake device is in the braking state, and reducing the supply amount in a case in which the brake device is in the released state.

Japanese Examined Patent Application Publication No. 6-3228 discloses a technique for reducing the amount of oil after a momentary time delay, rather than reducing the amount of lubricant at the same time that the clutch is released.

SUMMARY

However, in the brake device, the temperature of the rotating member sometimes does not adequately decrease when the brake device is switched from the braking state to the released state. In such cases, when the supply amount of lubricant is switched in accordance with the switch between the braking state and the released state of the brake device, as in the technique described in Japanese Unexamined Patent Application Publication No. 53-034054, the supply amount of lubricant is reduced even in the high-temperature state of the rotating member, and overheating of the rotating member may occur. The supply amount of lubricant needs to be set to a large value in order to prevent such overheating, and in this case, the effects for suppressing loss of driving force are reduced.

Although the technique of Japanese Examined Patent Application Publication No. 6-3228 can be considered to be an improvement over the technique of Japanese Unexamined Patent Application Publication No. 53-034054, the delay time for switching the oil amount is a fixed value. There is therefore more potential for improvement in terms of power loss reduction.

An object of the present invention is to provide a brake device lubrication device which can suppress loss of driving force and suppress overheating in a brake device, and to provide a method for controlling the brake device lubrication device.

A brake device lubrication device according to a first aspect of the present invention is a lubrication device for supplying lubricant for cooling to a brake device, and includes a lubricant supply device and a control unit. The lubricant supply device supplies a lubricant to the brake device. The control unit includes a braking timer, a release timer, and a storage unit. The braking timer counts a braking time which is the time elapsed from the start of braking by the brake device. The release timer counts a release time which is the time elapsed from the start of releasing by the brake device. The storage unit stores a relationship of correspondence between a delay time and the braking time. The control unit controls the lubricant supply unit so as to supply a predetermined first supply amount of the lubricant to the brake device when the brake device is in a braking state. The control unit also acquires a delay time which corresponds to the braking time counted by the braking timer from the relationship of correspondence stored by the storage unit, when the brake device is switched from the braking state to a released state. The control unit also switches the amount of lubricant from the first supply amount to a second supply amount which is smaller than the first supply amount when the release time counted by the release timer reaches the acquired delay time.

In this brake device lubrication device, when the brake device switches from the braking state to the released state, the amount of lubricant is reduced to the second supply amount when the delay time has elapsed, rather than being immediately reduced to the second supply amount. The delay time is acquired from the relationship of correspondence between the delay time and the braking time stored in the storage unit, and from the braking time that is actually counted. A delay time can therefore be set that is adapted for the amount of heat generated in the brake device. Loss of driving force in the brake device can thereby be suppressed, and overheating can be suppressed.

A brake device lubrication device according to a second aspect of the present invention is the brake device lubrication device according to the first aspect of the present invention, wherein the control unit stores a previous braking time counted by the braking timer in the storage unit. The control unit also uses the previous braking time stored in the storage unit to correct the current braking time counted by the braking timer.

In this brake device lubrication device, the current braking time is corrected by the previous braking time. A delay time that corresponds to the corrected braking time is then acquired. A delay time can therefore be set which takes into account the effect of the previous braking time. Overheating can thereby be suppressed even in a case in which there are residual effects of heating due to previous braking.

A brake device lubrication device according to a third aspect of the present invention is the brake device lubrication device according to the second aspect of the present invention, wherein the control unit sets the value of the previous braking time stored in the storage unit to zero in a case in which the release time counted by the release counter exceeds a pre-set reference time.

In this brake device lubrication device, in a case in which the release time counted by the release timer exceeds a pre-set reference time, a delay time that corresponds to the current braking time is set without correction using the previous braking time. It is therefore possible to prevent a delay time which takes into account the previous braking time from being set when there is no need to consider the effects of heat during the previous braking. Loss of driving force in the brake device can thereby be further suppressed.

A control method according to a fourth aspect of the present invention is a method for controlling a lubrication device for supplying a lubricant to a brake device for cooling the brake device, the method including: counting a braking time, which is the time elapsed from the start of braking by the brake device; counting a release time, which is the time elapsed from the start of releasing by the brake device; supplying a predetermined first supply amount of the lubricant to the brake device when the brake device is in a braking state; acquiring a delay time which corresponds to the braking time counted by the braking timer from a relationship of correspondence between the delay time and the braking time stored in advance, when the brake device is switched from the braking state to a released state; and switching a supply amount of lubricant from the first supply amount to a second supply amount which is smaller than the first supply amount when the release time counted by the release timer reaches the acquired delay time.

In this control method, when the brake device switches from the braking state to the released state, the amount of lubricant is reduced to the second supply amount when the delay time has elapsed, rather than being immediately reduced to the second supply amount. The delay time is acquired from the relationship of correspondence between the delay time and the braking time stored in the storage unit, and from the braking time that is actually counted. A delay time can therefore be set that is adapted for the amount of heat generated in the brake device. Loss of driving force in the brake device can thereby be suppressed, and overheating can be suppressed.

Through the brake device lubrication device and control method thereof according to the present invention, loss of driving force in the brake device can be suppressed, and overheating can be suppressed.

DESCRIPTION OF EMBODIMENTS

Configuration

Figure 1:
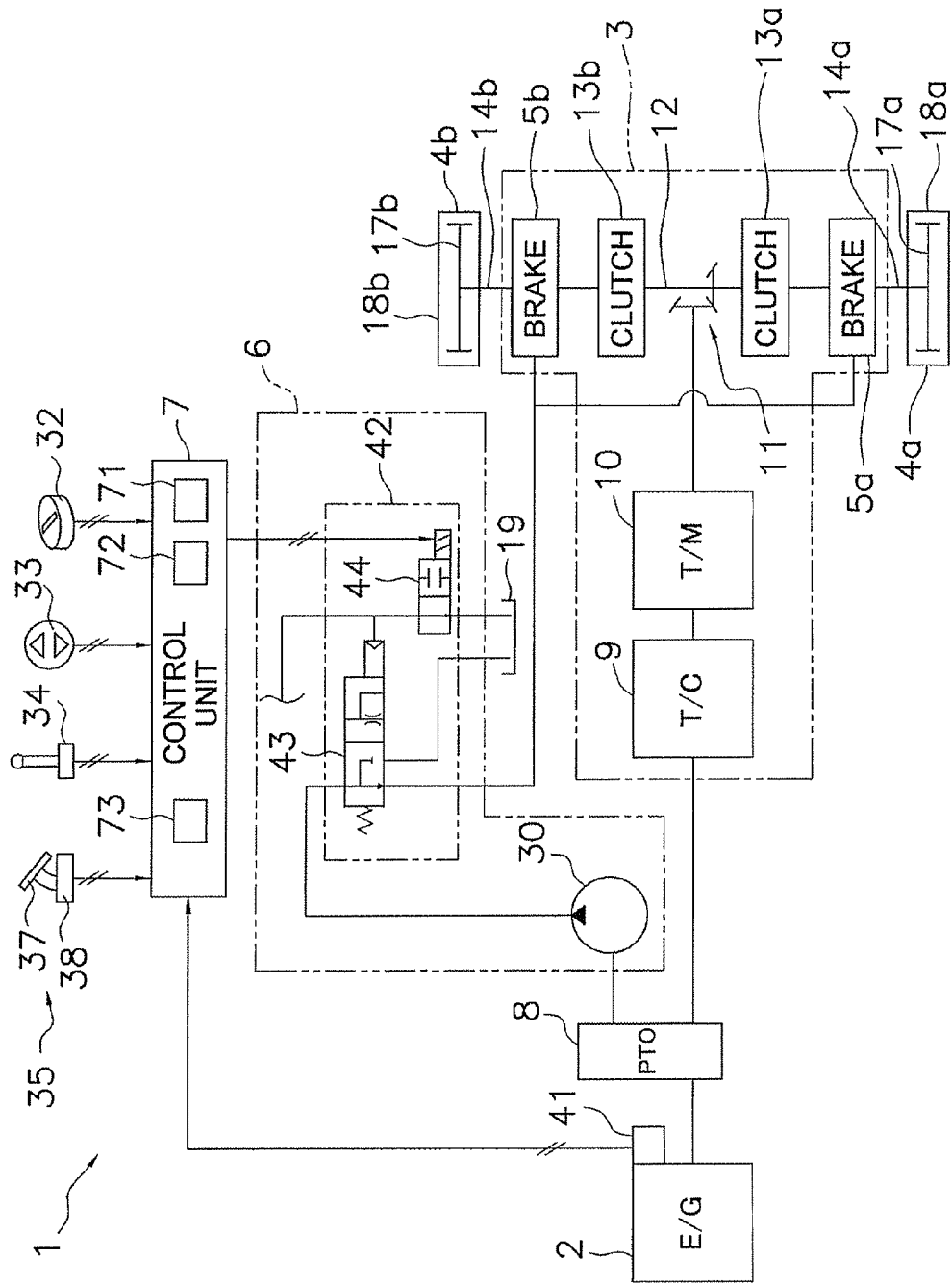
FIG. 1 is a view showing the overall system configuration of a work vehicle.

FIG. 1 is a view showing the overall system configuration of a work vehicle 1 which is provided with the lubrication device according to an embodiment of the present invention. The work vehicle 1 is a bulldozer, for example, and is provided with an engine 2, a drive train mechanism 3, a pair of travel devices 4a, 4b, a lubricant supply unit 6, various operation units 32 through 35, a control unit 7, and other components. Among these constituent components, the lubricant supply unit 6 and the control unit 7 constitute a lubrication device for supplying a lubricant for cooling to brake devices 5a, 5b. The various operation units 32 through 35 will be described in detail hereinafter.

The engine 2 is a diesel engine, and the output of the engine 2 is controlled by adjusting the injected amount of fuel from a fuel injection pump not shown in the drawing. Specifically, the engine speed and the fuel injection amount are adjusted according to load so that the actual engine speed matches the engine speed set by the control unit 7. Driving force from the engine 2 is distributed to the drive train mechanism 3 and/or a hydraulic pump 30 described hereinafter via a power takeoff device 8. The speed of the engine 2 is detected by an engine speed sensor 41 and transmitted as a detection signal to the control unit 7.

The drive train mechanism 3 is a mechanism for transmitting the driving force from the engine 2 to the pair of travel devices 4a, 4b, and includes a torque converter 9, a transmission 10, a bevel gear 11, a cross shaft 12, a pair of steering clutches 13a, 13b, a pair of brake devices 5a, 5b, a pair of output shafts 14a, 14b, and other components.

The torque converter 9 transmits the driving force from the engine 2 to the transmission 10.

The transmission 10 is a device for changing the speed of the driving force transmitted from the engine 2 to the output shafts 14a, 14b, and transmits the driving force from the torque converter 9 to the bevel gear 11. The transmission 10 is controlled by a control signal from the control unit 7, and thereby switches between forward and reverse. The transmission 10 is also controlled by a control signal from the control unit 7, and thereby switches speed stages. For example, it is possible to switch between forward speeds 1 through 3 and reverse speeds 1 through 3. The driving force of the engine 2 outputted from the transmission 10 is transmitted to the bevel gear 11.

Figure 2:
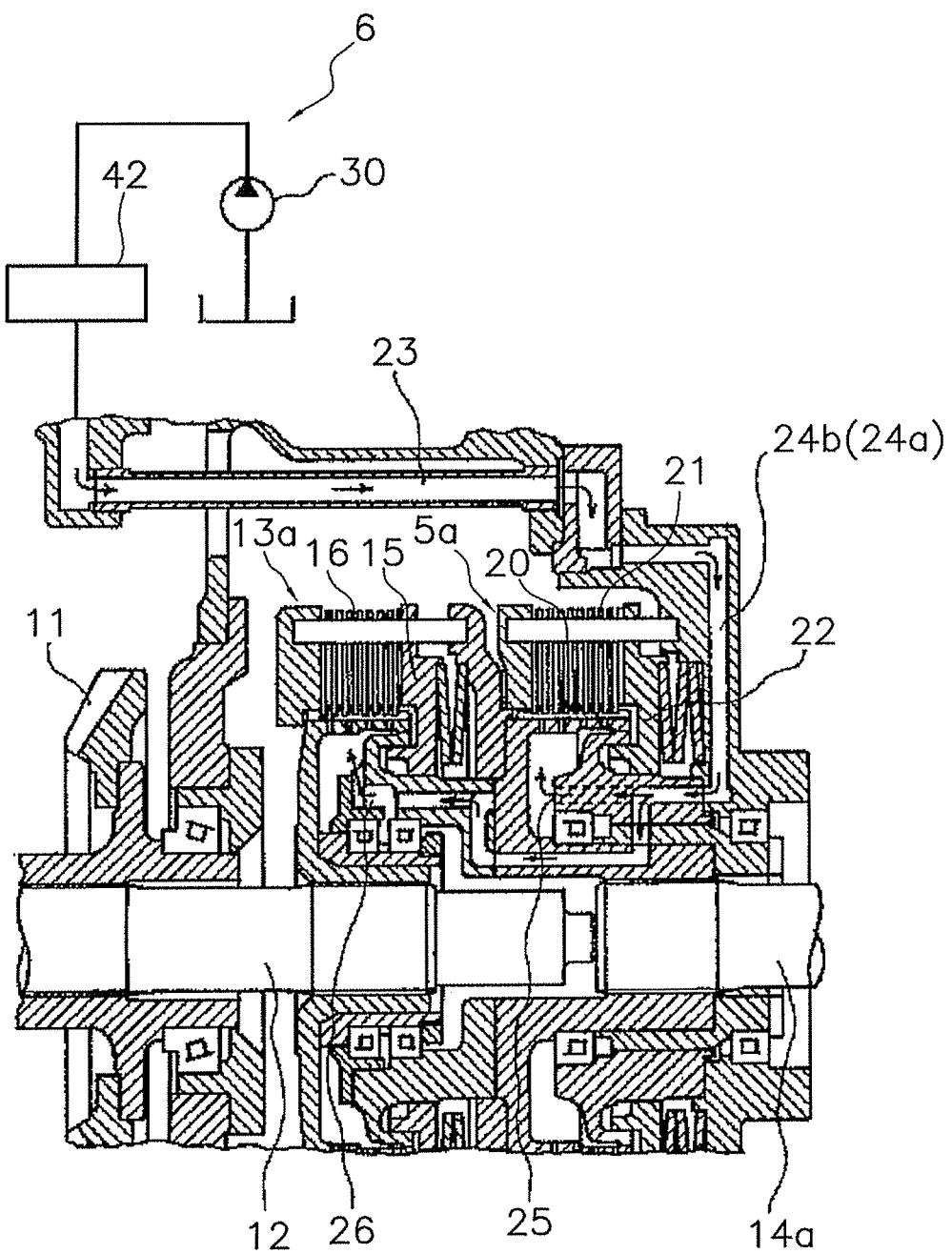
FIG. 2 is a sectional view showing the configuration of the brake device.

As shown in FIG. 2, the power transferred to the bevel gear 11 is transferred to the output shaft 14a via the cross shaft 12 and the steering clutch 13a. The steering clutch 13a is a wet multi-plate clutch, and is turned ON and OFF by a clutch piston 15, whereby clutch discs 16 are pressed together by a coned disk spring and disconnected by hydraulic pressure. In FIG. 2, only one steering clutch 13a of the pair of steering clutches 13a, 13b is shown, but the other steering clutch 13b has the same structure.

The driving force outputted through the steering clutches 13a, 13b is inputted to the brake devices 5a, 5b. The brake device 5a is a so-called wet multi-plate brake device, and has a plurality of brake discs 20, a plurality of fixed plates 21, and a brake piston 22. The brake discs 20 are arranged between the fixed plates 21, and braking force is generated by the pressing together of the plurality of brake discs 20 which rotates together with the cross shaft 12 and the output shaft 14a, and the fixed plates 21 which are fixed on the vehicle body side. The brake device 5a is a so-called negative brake, and in a state in which hydraulic pressure is not applied to the brake piston 22, a braking state occurs in which the brake discs 20 and the fixed plates 21 are pressed together by the urging force of the coned disk spring. Applying hydraulic pressure to the brake piston 22 causes the brake piston 22 to separate the brake discs 20 and the fixed plates 21 from each other against the urging force of the coned disk spring. The brake device 5a is thereby placed in a released state. Only one brake device 5a of the pair of brake devices 5a, 5b is shown in FIG. 2, but the other brake device 5b has the same structure.

The pair of travel devices 4a, 4b includes sprockets 17a, 17b, respectively, and crawler tracks 18a, 18b which are wrapped around the sprockets 17a, 17b, respectively, as shown in FIG. 1. The sprockets 17a, 17b are coupled to the output shafts 14a, 14b, respectively, of the drive train mechanism 3, and the driving force from the engine 2 is transmitted to the sprockets 17a, 17b via the drive train mechanism 3. When the sprockets 17a, 17b are rotationally driven, the crawler tracks 18a, 18b wrapped around the sprockets 17a, 17b are driven, and the work vehicle 1 thereby travels.

Frictional heat occurs in the brake discs 20 when the brake devices 5a, 5b are repeatedly switched between the braking state and the released state. In the brake devices 5a, 5b, the brake discs 20 are lubricated and cooled by lubricant which is supplied from the lubricant supply unit 6. As shown in FIG. 2, the lubricant supplied from the lubricant supply unit 6 passes through a lubricant supply path 23 as indicated by the arrows, and branches into two passages which include a brake supply path 24a and a clutch supply path 24b. In FIG. 2, the brake supply path 24a and the clutch supply path 24b are disposed so as to overlap, and the brake supply path 24a is positioned to the rear of the clutch supply path 24b. The lubricant sent to the brake supply path 24a passes through a brake supply port 25, passes through the gaps of the brake discs 20, and lubricates and cools the brake discs 20. The lubricant sent to the clutch supply path 24b passes through a clutch supply port 26, passes through the gaps of the clutch discs 16, and lubricates and cools the clutch discs 16. The lubricant that has passed through the gaps of the brake disks 20, and the lubricant that has passed through the gaps of the clutch discs 16 passes through a recovery passage not shown in the drawing, and is recovered in a tank 19 (see FIG. 1).

The lubricant supply unit 6 is a device for supplying the lubricant to the brake devices 5a, 5b, and includes a hydraulic pump 30 and a brake demand valve 42, as shown in FIG. 1.

The hydraulic pump 30 is a fixed-displacement pump driven by the driving force from the engine 2 transmitted via the power takeoff device 8, and discharges the lubricant for cooling the brake devices 5a, 5b described above.

The brake demand valve 42 is a device for controlling the amount of lubricant supplied to the brake devices 5a, 5b. The brake demand valve 42 includes a flow rate switching valve 43 and a pilot control valve 44.

The flow rate switching valve 43 switches the supply amount of lubricant supplied to the brake devices 5a, 5b. The flow rate switching valve 43 is controlled in accordance with a supplied pilot pressure, and can switch between a first state and a second state. In the first state, the flow rate switching valve 43 supplies the full amount (hereinafter referred to as the "first supply amount") of the lubricant discharged from the hydraulic pump 30 to the brake devices 5a, 5b. In the second state, the flow rate switching valve 43 reduces the amount of lubricant discharged from the hydraulic pump 30 to a second supply amount which is smaller than the first supply amount, and supplies the second supply amount to the brake devices 5a, 5b. The flow rate switching valve 43 is placed in the first state by the urging force of a spring when the pilot pressure is not being applied to the flow rate switching valve 43. When the pilot pressure is applied to the flow rate switching valve 43, the flow rate switching valve 43 is placed in the second state.

The pilot control valve 44 is an electromagnetic control valve controlled by a control signal from the control unit 7, and the pilot control valve 44 controls the pilot pressure applied to the flow rate switching valve 43. In a case in which the pilot control valve 44 is in a non-excited state, the pilot pressure is not applied to the flow rate switching valve 43. In this state, the flow rate switching valve 43 is maintained in the first state, and the high-flow first supply amount of lubricant is supplied to the brake devices 5a, 5b. In a case in which the pilot control valve 44 is in an excited state, the pilot pressure is applied to the flow rate switching valve 43. In this state, the flow rate switching valve 43 is maintained in the second state, and the low-flow second supply amount of lubricant is supplied to the brake devices 5a, 5b.

The various operation units 32 through 35 are provided in a driver's cab not shown in the drawing, and are capable of causing various actions in the work vehicle 1 by being operated by an operator. The operational specifics of the operation units 32 through 35 are sent to the control unit 7 as operation signals. The operation units 32 through 35 include a throttle operation unit 32, a speed shift operation unit 33, a steering operation unit 34, a brake operation unit 35, and other components.

The throttle operation unit 32 issues instructions to change the engine speed. The engine speed instructed by the throttle operation unit 32 is inputted to the control unit 7, and the control unit 7 controls the engine 2 so that the engine speed matches the instructed speed.

The speed shift operation unit 33 issues instructions to switch the speed stage of the transmission 10. In the work vehicle 1, it is possible to switch speed stages from a first speed to a third speed in each of forward and reverse. When the operator operates the speed shift operation unit 33, the control unit 7 switches the transmission 10 to the speed stage instructed by the speed shift operation unit 33. The operator can thereby manually switch the speed stage. Speed shifting of the transmission 10 may also be performed automatically by a decision by the control unit 7.

The steering operation unit 34 issues instructions to switch between forward and reverse, and to switch the steering direction of the work vehicle 1. The operator can switch the forward state and the reverse state of the transmission 10 by tilting the steering operation unit 34 forward or backward. The operator can also adjust the steering, i.e., the travel direction, of the work vehicle 1 by tilting the steering operation unit 34 left or right. Specifically, the control unit 7 controls the pair of steering clutches 13a, 13b and the pair of brake devices 5a, 5b in accordance with the operation signals from the steering operation unit 34, and the operations described above are thereby switched. For example, when both of the steering clutches 13a, 13b are switched ON, and both of the brake devices 5a, 5b are placed in the released state, the work vehicle 1 travels straight. When one steering clutch 13a is then switched OFF from this state, the work vehicle 1 gently turns. When one steering clutch 13a is switched OFF, and the brake device 5a on the same side as the switched-off steering clutch 13a is placed in the braking state, the vehicle pivot-turns. In the case of turning in the opposite direction from that described above, the steering clutch 13b is switched OFF, and the brake device 5b is placed in the braking state.

Figure 3:
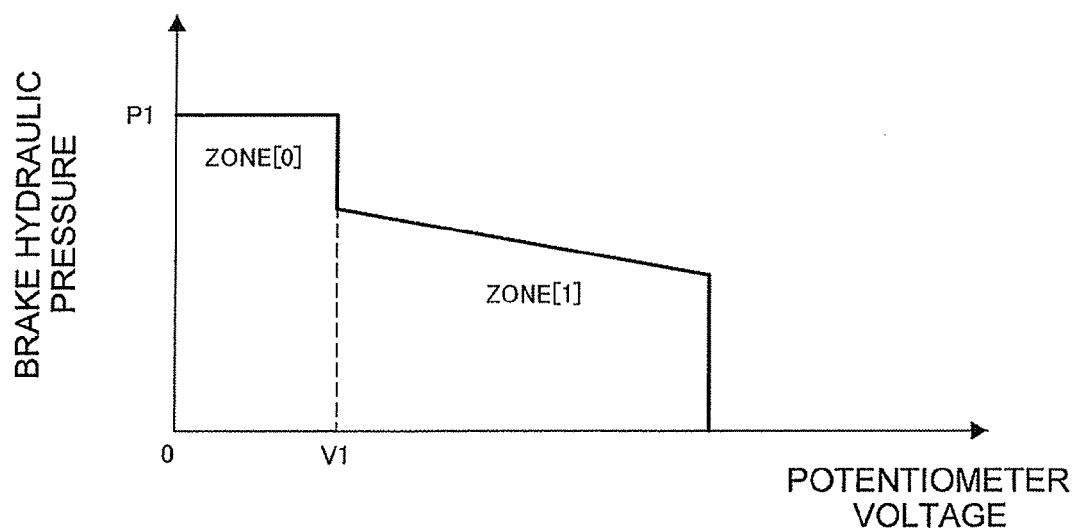
FIG. 3 is a graph showing the relationship between the potentiometer voltage in the brake signal and the brake hydraulic pressure.

The brake operation unit 35 issues instructions to decelerate the work vehicle 1, and the brake operation unit 35 includes a brake pedal 37 and a potentiometer 38. When the brake pedal 37 is depressed to the maximum degree, both of the steering clutches 13a, 13b are switched OFF, both of the brake devices 5a, 5b are in the state of maximum braking force, and the vehicle stops. When the brake pedal is depressed, a brake signal having a potentiometer voltage corresponding to the depression amount is inputted from the potentiometer 38 to the control unit 7. As shown in FIG. 3, the control unit 7 controls the brake hydraulic pressure in accordance with the potentiometer voltage corresponding to the operation amount of the brake operation unit 35. The brake hydraulic pressure is the hydraulic pressure applied to the brake piston 22 in the direction in which the brake discs 20 separate from the fixed disc against the urging force of the coned disk spring, and the braking force of the brake devices 5a, 5b is controlled by controlling the brake hydraulic pressure. Specifically, in a case in which the potentiometer voltage is in a range (hereinafter referred to as "ZONE [1]") of V1 or higher, the brake hydraulic pressure decreases the more the potentiometer voltage increases. The force against the urging force of the coned disk spring thereby decreases, and the braking force increases as a result of the increased force with which the brake discs 20 and the fixed plates 21 press together. In a case in which the potentiometer voltage is in a range (hereinafter referred to as "ZONE [0]") less than V1, the brake hydraulic pressure is maintained at P1. In this case, the state is maintained in which the brake discs 20 are separated from the fixed plates 21 against the urging force of the coned disk spring. In other words, a play is provided to the brake pedals so that the brake is not placed in the braking state in cases in which the brake pedal is depressed a small amount.

Although not shown in the drawing, the work vehicle 1 includes a work equipment such as a blade, a hydraulic cylinder for driving the work equipment, and a hydraulic pump for supplying pressure oil to the hydraulic cylinder. Various types of work can also be performed by the work equipment by operating a work equipment operation unit not shown in the drawing.

The control unit 7 is composed of a computational processing device such as a microprocessor or a numerical processor, memory, and other components. The control unit 7 controls the engine 2, the drive train mechanism 3, and other components on the basis of operation signals from the operation units 32 through 35, detection signals from various sensors including the engine speed sensor 41, and other signals.

Figure 4:
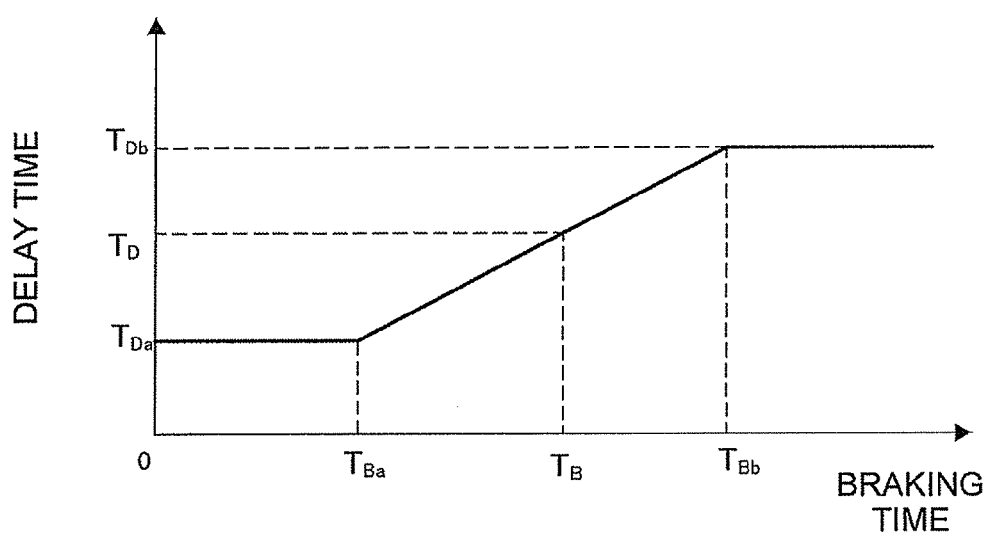
FIG. 4 is a graph showing the delay time map.

As shown in FIG. 1, the control unit 7 includes a braking timer 71, a release timer 72, and a storage unit 73. The braking timer 71 counts the braking time, which is the time elapsed from the start of braking by the brake devices 5a, 5b. The release timer 72 counts the release time, which is the time elapsed from the start of release by the brake devices 5a, 5b. The storage unit 73 stores a delay time map. The delay time map is a map indicating the relationship of correspondence between the braking time and the delay time, and is calculated in advance by experimentation, simulation, or another method and stored in the storage unit 73. In the delay time map as shown in FIG. 4, in the range $0 \leq T_B < T_{Ba}$ for the braking time $T_B$, the delay time $T_D$ is constant at $T_{Da}$. In the range $T_{Ba} \leq T_B < T_{Bb}$ for the braking time $T_B$, the delay time $T_D$ increases from $T_{Da}$ to $T_{Db}$ as the braking time $T_B$ increases. In the range $T_B \geq T_{Ba}$ for the braking time $T_B$, the delay time $T_D$ is constant at $T_{Db}$. The control unit 7 uses the functions of the timers described above and the delay time map stored in the storage unit 73 to control the lubricant supply unit 6, and controls the amount of lubricant supplied to the brake devices 5a, 5b.

In a case in which the brake devices 5a, 5b are in the released state, the control unit 7 places the brake demand valve 42 in the ON state. In other words, the pilot control valve 44 is placed in the excited state, and the flow rate switching valve 43 is placed in the second state. The low-flow second supply amount of lubricant is thereby supplied to the brake devices 5a, 5b. In a case in which the brake devices 5a, 5b are in the braking state, the control unit 7 places the brake demand valve 42 in the OFF state. In other words, the pilot control valve 44 is placed in the non-excited state, and the flow rate switching valve 43 is placed in the first state. The high-flow first supply amount of lubricant is thereby supplied to the brake devices 5a, 5b. However, in a case in which the brake devices 5a, 5b are switched from the braking state to the released state, the control unit 7 reduces the amount of lubricant from the first supply amount to the second supply amount when the release time counted by the release timer 72 from the start of releasing by the brake devices 5a, 5b reaches the delay time. The delay time map shown in FIG. 4 is used to acquire the delay time $T_D$ that corresponds to the braking time $T_B$ counted by the braking timer 71.

The control unit 7 stores a previous braking time in the storage unit 73. In a case in which the release time is less than the delay time, the control unit 7 uses the previous braking time to correct the current braking time. The corrected braking time is then used to calculate the delay time. However, the control unit 7 sets the previous braking time stored in the storage unit 73 to zero in a case in which the release time exceeds the delay time. In other words, the previous braking time is disregarded, and only the current braking time is used to calculate the delay time.

Control of the Supply Amount of Lubricant

Figure 5:
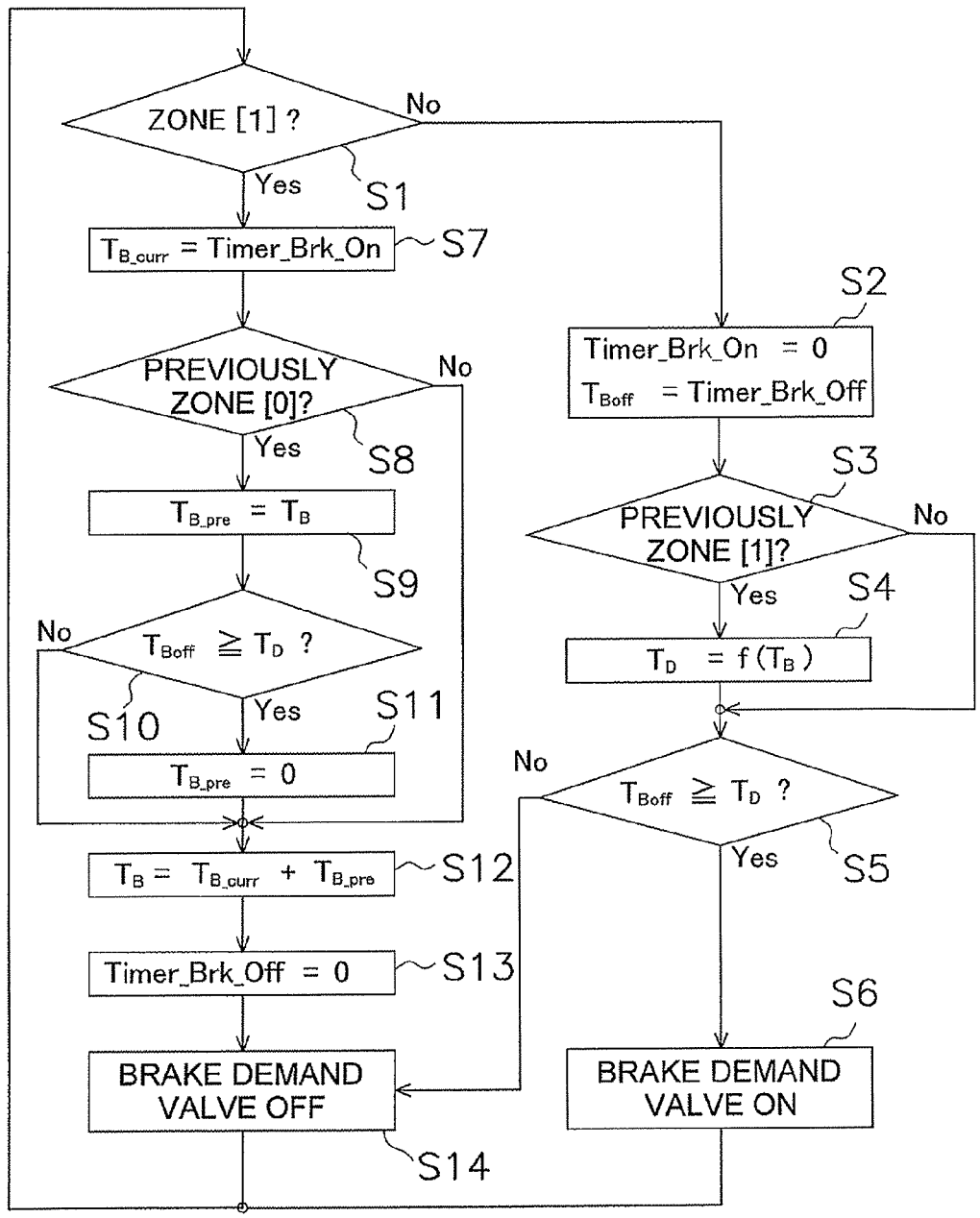
FIG. 5 is a flowchart showing control of the supply amount of the lubricant.

Control of the amount of lubricant supplied to the brake devices 5a, 5b, performed by the control unit 7, will be described in detail based on the flowchart of FIG. 5 and the timing charts of FIGS. 6 and 7. The initial values of the parameters Timer_Brk_On, $T_B$, $T_D$, $T_{B\_pre}$, and $T_{B\_curr}$ used in the flowchart of FIG. 5 are set to zero. The initial values of the parameters Timer_Brk_Off and $T_{Boff}$ are set to the maximum value (0xFFFF). When the engine 2 is started, the parameters are set to the initial value. A configuration may also be adopted in which each parameter is set to the initial value when a travel lock lever not shown in the drawing is released, i.e., when travel is enabled, rather than when the engine 2 is started.

Figure 6:
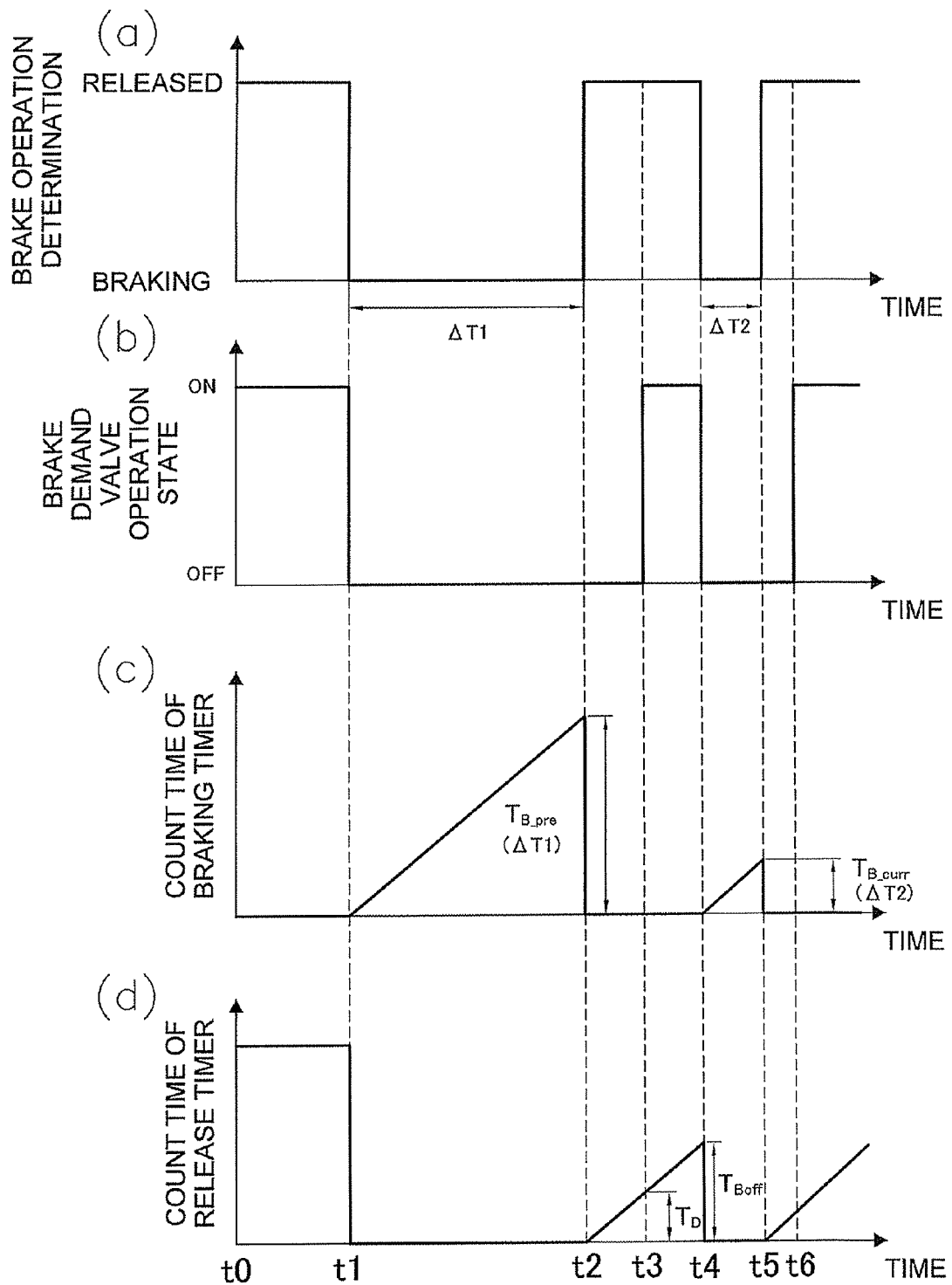
FIG. 6 is a timing chart showing control of the supply amount of the lubricant.

First, at time t0 in the timing chart of FIG. 6, the brake devices 5a, 5b are in the released state. Consequently, a determination is made in step S1 that the brake signal is not ZONE [1], and the process proceeds to step S2.

In step S2, the count value Timer_Brk_On of the braking timer 71 is set to zero. The release timer 72 also counts, and the count value Timer_Brk_Off thereof is set as the value of the release time $T_{Boff}$. However, the count value Timer_Brk_Off remains unchanged from the initial value, which is the maximum value 0xFFFF. The count value Timer_Brk_On of the braking timer 71 also remains unchanged from the initial value of zero.

In step S3, a determination is made as to whether the brake signal at the time of the previous determination is ZONE [1]. Since this is the first determination after initialization, and there is no prior determination, the determination is made that the previous brake signal is not ZONE [1], and the process proceeds to step S5.

In step S5, a determination is made as to whether the release time $T_{Boff}$ is equal to or greater than the delay time TD. Since the delay time $T_D$ herein is the initial value of zero, and the release time $T_{Boff}$ is the maximum value 0xFFFF, the determination is made that the release time $T_{Boff}$ is equal to or greater than the delay time $T_D$, and the process proceeds to step S6.

In step S6, the brake demand valve 42 is switched ON. The low-flow second supply amount of lubricant is thereby supplied to the brake devices 5a, 5b. In other words, the second supply amount of lubricant is supplied to the brake devices 5a, 5b in a case in which the brake devices 5a, 5b are in the released state.

The process then returns to step S1, and steps S1, S2, S3, S5, and S6 are repeated until time t1.

When time t1 is reached, the brake devices 5a, 5b are switched to the braking state. A determination is therefore made in step S1 that the brake signal is ZONE [1], and the process proceeds to step S7.

In step S7, the braking timer 71 counts, and the count value Timer_Brk_On thereof is set to the current braking time $T_{B\_curr}$. In other words, the time elapsed from time t1 is set as the current braking time $T_{B\_curr}$.

In step S8, a determination is made that the brake signal at the time of the previous determination is ZONE [0]. A determination is made herein that the brake signal at the time of the previous determination is ZONE [0], and the process proceeds to step S9.

In step S9, the braking time $T_B$ stored in the storage unit 73 is set as the previous braking time $T_{B\_pre}$. Since the braking time $T_B$ remains at the initial value of zero, the previous braking time $T_{B\_pre}$ is set to zero.

In step S10, a determination is made as to whether the release time $T_{Boff}$ is equal to or greater than the delay time $T_D$. The delay time $T_D$ herein remains at the initial value of zero, and the release time $T_{Boff}$ is the maximum value 0xFFFF. A determination is therefore made that the release time $T_{Boff}$ is equal to or greater than the delay time $T_D$, and the process proceeds to step S11.

In step S11, the previous braking time $T_{B\_pre}$ is set to zero.

In step S12, the sum of the current braking time $T_{B\_curr}$ and the previous braking time $T_{B\_pre}$ is set as the braking time $T_B$. Since the previous braking time $T_{B\_pre}$ herein is zero, the current braking time $T_{B\_curr}$, i.e., the time elapsed from time t1, is set as the braking time $T_B$.

In step S13, the count value Timer_Brk_Off of the release timer 72 is set to zero.

In step S14, the brake demand valve 42 is switched OFF. The high-flow first supply amount of lubricant is thereby supplied to the brake devices 5a, 5b. In other words, the first supply amount of lubricant is supplied to the brake devices 5a, 5b in a case in which the brake devices 5a, 5b are in the braking state.

The process then returns to step S1, and steps S1, S7, S8, S12, S13, and S14 are then repeated until time t2. However, in step S8, a determination is made that the brake signal at the time of the previous determination is not ZONE [0], and the process proceeds to step S12. The time ΔT1 from time t1 to time t2 is thereby set as the braking time $T_B$ and stored in the storage unit 73 when time t2 is reached.

When time t2 is reached, the brake is placed in the released state. A determination is therefore made in step S1 that the brake signal is not ZONE [1], and the process proceeds to step S2.

In step S2, the count value Timer_Brk_On of the braking timer 71 is set to zero. The release timer 72 also counts, and the count value Timer_Brk_Off thereof is set as the value of the release time $T_{Boff}$. Since the count value Timer_Brk_Off is set to zero in step S13, the time elapsed from time t2 is set as the value of the release time $T_{Boff}$.

In step S3, a determination is made as to whether the brake signal at the time of the previous determination is ZONE [1]. A determination is made herein that the brake signal at the time of the previous determination is ZONE [1], and the process proceeds to step S4.

In step S4, the delay time $T_D$ is computed from the braking time $T_B$. The delay time $T_D$ herein is computed from the braking time $T_B$ and the delay time map shown in FIG. 4. Since the time ΔT1 from time t1 to time t2 is set as the braking time $T_B$ herein, the delay time $T_D$ that corresponds to the time ΔT1 in the delay time map is set.

In step S5, a determination is made as to whether the release time $T_{Boff}$ is equal to or greater than the delay time $T_D$. A determination is made herein as to whether the release time $T_{Boff}$ is equal to or greater than the delay time $T_D$ computed in step S4. In a case in which the release time $T_{Boff}$ is not equal to or greater than the delay time $T_D$, the process proceeds to step S14, and the brake demand valve 42 is maintained in the OFF state. The amount of lubricant supplied to the brake devices 5a, 5b is therefore maintained at the first supply amount.

The process then returns to step S1, and steps S1, S2, S3, S5, and S14 are repeated until time t3 is reached. In step S3, a determination is made that the brake signal at the time of the previous determination is not ZONE [1], and the process proceeds to step S5.

When time t3 is reached, a determination is made in step S5 that the release time $T_{Boff}$ is equal to or greater than the delay time $T_D$, and the process proceeds to step S6.

In step S6, the brake demand valve 42 is switched ON. The amount of lubricant supplied to the brake devices 5a, 5b is thereby reduced from the first supply amount to the second supply amount. The process then returns to step S1, and steps S1, S2, S3, S5, and S6 are repeated until time t4 is reached. The amount of lubricant supplied to the brake devices 5a, 5b is thereby maintained at the second supply amount.

When time t4 is reached, the brake devices 5a, 5b are switched to the braking state. In this case, the process proceeds to step S9 via steps S1, S7, and S8, in the same manner as described above.

In step S9, the braking time $T_B$ stored in the storage unit 73 is set as the previous braking time $T_{B\_pre}$. The time ΔT1 from time t1 to time t2 is stored in the storage unit 73 as the braking time $T_B$. The previous braking time $T_{B\_pre}$ is therefore set to the time ΔT1.

In step S10, a determination is made as to whether the release time $T_{Boff}$ is equal to or greater than the delay time $T_D$. Since the release time $T_{Boff}$ herein is equal to or greater than the delay time $T_D$, the process proceeds to step S11.

In step S11, the previous braking time $T_{B\_pre}$ is reset from the time ΔT1 to zero.

In step S12, the sum of the current braking time $T_{B\_curr}$ and the previous braking time $T_{B\_pre}$ is set as the braking time $T_B$. Since the previous braking time $T_{B\_pre}$ herein is zero, the current braking time $T_{B\_curr}$, i.e., the time elapsed from time t4, is set as the braking time $T_B$.

In step S13, the count value Timer_Brk_Off of the release timer 72 is set to zero.

In step S14, the brake demand valve 42 is switched OFF. The amount of lubricant supplied to the brake devices 5a, 5b is thereby increased from the second supply amount to the first supply amount.

The process then returns to step S1, and steps S1, S7, S8, S12, S13, and S14 are then repeated until time t5. In step S8, a determination is made that the brake signal at the time of the previous determination is not ZONE [0], and the process proceeds to step S12. The time ΔT2 from time t4 to time t5 is thereby set as the braking time $T_B$ when time t5 is reached.

When time t5 is reached, the delay time $T_D$ that corresponds to the time ΔT2 is computed in step S4 in the same manner as in the process flow described above, and from time t5, the brake demand valve 42 is switched ON at time t6 when the delay time $T_D$ that corresponds to the time ΔT2 has elapsed.

In the example described above, the brake devices 5a, 5b are switched to the braking state after the delay time $T_D$ has elapsed from time t2 (see time t4). Following is a description of the processing performed in a case in which the brake devices 5a, 5b are switched to the braking state before the delay time $T_D$ has elapsed from time t2.

Figure 7:
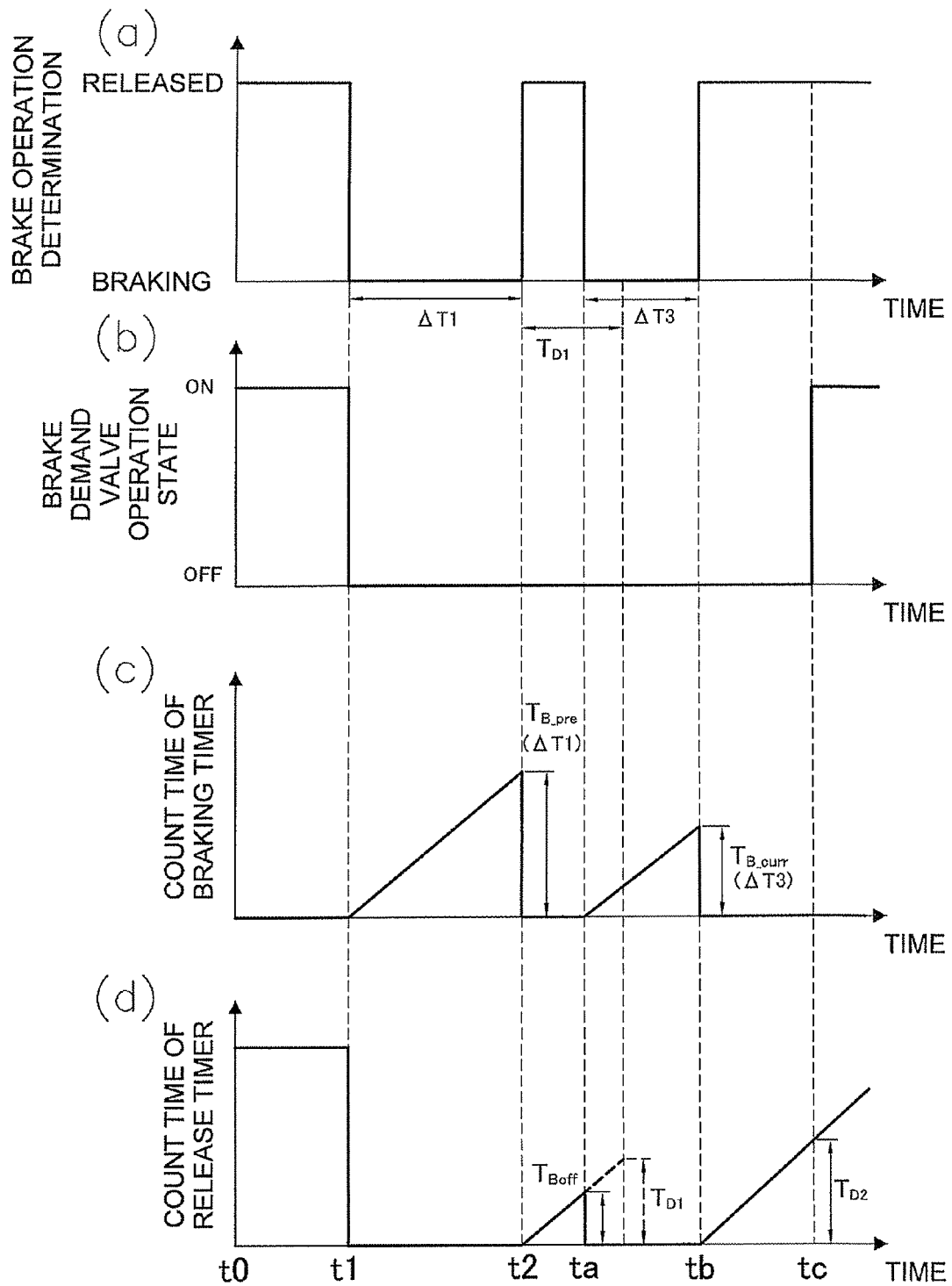
FIG. 7 is a timing chart showing control of the supply amount of the lubricant.

As shown in FIG. 7, the processing until time t2 is the same as described above. The time $\Delta T1$ from time t1 to time t2 is thereby stored in the storage unit 73 as the braking time $T_B$. Steps S1, S2, S3, S5, and S14 are also repeated from time t2 until time ta, and the brake demand valve 42 is maintained in the OFF state. The amount of lubricant supplied to the brake devices 5a, 5b is therefore maintained at the first supply amount.

When the brake devices 5a, 5b are switched from the released state to the braking state at time ta before the delay time $T_D$ (see "TD1" in FIG. 7) that corresponds to the time $\Delta T1$ elapses from time t2, the process proceeds to step S9 via steps S1, S7, and S8.

In step S9, the braking time $T_B$ stored in the storage unit 73 is set as the previous braking time $T_{B\_pre}$. The time $\Delta T1$ from time t1 to time t2 is stored in the storage unit 73 herein as the braking time $T_B$. The previous braking time $T_{B\_pre}$ is thereby set to the time $\Delta T1$.

In step S10, a determination is made as to whether the release time $T_{Boff}$ is equal to or greater than the delay time $T_D$. Since the release time $T_{Boff}$ herein is the time from time t2 to time ta, and is not equal to or greater than the delay time $T_D$, the process proceeds to step S12.

In step S12, the sum of the current braking time $T_{B\_curr}$ and the previous braking time $T_{B\_pre}$ is set as the braking time $T_B$. In this instance, $\Delta T1$, which is the previous braking time $T_{B\_pre}$, and the time elapsed from time ta, which is the current braking time $T_{B\_curr}$, are set as the braking time TB.

In step S13, the count value Timer_Brk_Off of the release timer 72 is set to zero.

In step S14, the brake demand valve 42 is maintained in the OFF state. The amount of lubricant supplied to the brake devices 5a, 5b is thereby maintained at the first supply amount.

The process then returns to step S1, and steps S1, S7, S8, S12, S13, and S14 are then repeated until time tb. The sum of the time $\Delta T1$ from time t1 to time t2, and the time $\Delta T3$ from time ta to time tb is thereby set as the braking time $T_B$ when time tb is reached.

When the brake devices 5a, 5b are then switched from the braking state to the released state at time tb, the process proceeds to step S4 via steps S1, S2, and S3.

In step S4, the delay time $T_D$ is computed from the braking time TB. Since the sum of the time $\Delta T1$ and the time $\Delta T3$ is set as the braking time $T_B$ herein, the delay time (see "TD2" in FIG. 7) is set that corresponds to the sum of the time $\Delta T1$ and the time $\Delta T3$ in the delay time map.

In step S5, a determination is made as to whether the release time $T_{Boff}$ is equal to or greater than the delay time $T_D$. A determination is made herein as to whether the release time $T_{Boff}$ is equal to or greater than the delay time $T_D$ computed in step S4. In a case in which the release time $T_{Boff}$ is not equal to or greater than the delay time $T_D$, the process proceeds to step S14, and the brake demand valve 42 is maintained in the OFF state. The amount of lubricant supplied to the brake devices 5a, 5b is therefore maintained at the first supply amount.

The process then returns to step S1, and steps S2, S3, S5, and S14 are repeated until time tc is reached.

When time tc is reached, a determination is made in step S5 that the release time $T_{Boff}$ is equal to or greater than the delay time $T_D$, and the process proceeds to step S6. The brake demand valve 42 is switched ON in step S6. The amount of lubricant supplied to the brake devices 5a, 5b is thereby reduced from the first supply amount to the second supply amount.

Features

In the lubrication device for the brake devices 5a, 5b, when the brake devices 5a, 5b switch from the braking state to the released state, the amount of lubricant is reduced to the second supply amount when the delay time has elapsed, rather than being immediately reduced to the second supply amount. The delay time is acquired from the delay time map stored in the storage unit 73, and from the braking time that is actually counted. A delay time can therefore be set that is adapted for the amount of heat generated in the brake devices 5a, 5b. Loss of driving force in the brake devices 5a, 5b can thereby be suppressed, and overheating can be suppressed.

In a case in which the brake devices 5a, 5b are switched to the braking state before the delay time has elapsed from the start of releasing by the brake devices 5a, 5b, the delay time when the brake devices 5a, 5b are subsequently switched to the released state is computed from the value obtained by adding together the current braking time and the previous braking time. The brake devices 5a, 5b in which heat remains due to inadequate cooling during the previous release can thereby be adequately cooled at the current release.

In a case in which the brake devices 5a, 5b are switched to the braking state after the delay time has elapsed, the delay time when the brake devices 5a, 5b are subsequently switched to the released state is computed from only the current braking time, and not by adding the previous braking time. It is thereby possible to prevent an unnecessarily long delay time from being set, and to suppress loss of driving force in the brake devices 5a, 5b.

Other Embodiments (a) In the embodiment described above, a map is used to indicate the relationship of correspondence between the braking time and the delay time, but a table or other computation means may also be used. The delay time map is also not limited to a shape such as that described above, and a delay time map having a different shape may also be used.

(b) In the embodiment described above, the second supply amount is described as a small supply amount, but the second supply amount may also be zero. The first supply amount is also described as being the full amount discharged from the hydraulic pump 30, but the first supply amount may also be an amount smaller than the full amount.

(c) In the embodiment described above, a demand time is used as the reference time when the value of the previous braking time stored in the storage unit 73 is zero, but another reference time may be used. For example, a predetermined constant, a value obtained by multiplying the demand time by a predetermined constant, or another value may be used.

Figure 8:
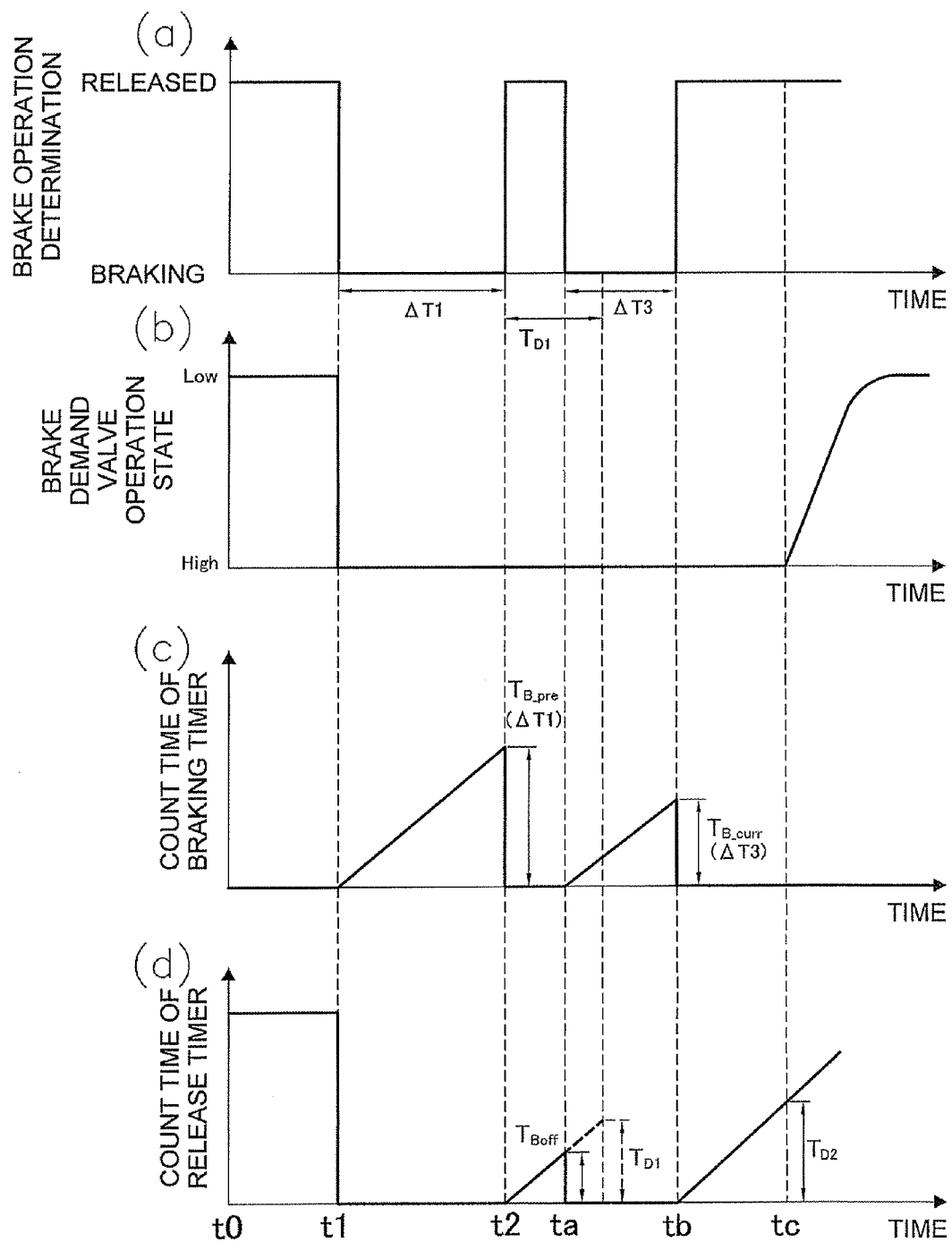
FIG. 8 is a timing chart showing control of the supply amount of the lubricant in another embodiment.

(d) The flow rate switching valve 43 may be controlled steplessly or in three or more stages by proportional control. In this case, the brake demand valve 42 is switched steplessly between a High state and a Low state, as shown in FIG. 8B. The High state corresponds to the abovementioned OFF state of the brake demand valve 42, and is a state in which the amount of lubricant is at the maximum flow rate, for example. The Low state corresponds to the abovementioned ON state of the brake demand valve 42, and is a state in which the amount of lubricant is at 50% of the maximum flow rate, for example.

In this case, when a determination is made that the release time $T_{Boff}$ has reached the delay time $T_D$ at time tc, the brake demand valve 42 is then gradually changed from the High state toward the Low state. Specifically, the degree of opening of the flow rate switching valve 43 is gradually reduced by the gradual increase of the electric current value of the control signal to the pilot control valve 44. The amount of lubricant supplied to the brake devices 5a, 5b is thereby gradually reduced from the first supply amount to the second supply amount after time tc.

(e) Control of the supply amount of lubricant described above can also be applied in a case in which braking and releasing of the brake devices 5a, 5b are switched by operating the steering operation unit 34. In this case, the amount of lubricant supplied to the brake devices 5a, 5b on both the left and right sides may be increased even when the brake device of only one side is in the braking state during a steering operation, for example. A configuration may be adopted in which the amount of lubricant for the other brake device, which is in the released state, is not increased in a case in which only one of the brake devices is in the braking state during a steering operation.

(f) In the embodiment described above, a bulldozer is described as an example of the work vehicle 1, but the present invention may be applied to other work vehicles.

The illustrated embodiment is capable of suppressing loss of driving force in a braking device, as well as suppressing overheating, and is useful in a work vehicle and as a method for controlling a work vehicle.

The invention claimed is:

1. A brake device lubrication device adapted to supply a lubricant to a brake device for cooling the brake device, the brake device lubrication device comprising:
    a lubricant supply unit configured and arranged to supply the lubricant to the brake device; and
    a control unit including
        a braking timer configured to count a braking time which is time elapsed from start of braking by the brake device,
        a release timer configured to count a release time which is time elapsed from start of releasing by the brake device, and
        a storage unit configured to store a relationship of correspondence between the braking time and a delay time,
    the control unit being configured to control the lubricant supply unit so as to supply a predetermined first supply amount of the lubricant to the brake device when the brake device is in a braking state, the control unit being configured to acquire the delay time corresponding to the braking time counted by the braking timer from the relationship of correspondence stored by the storage unit when the brake device is switched from the braking state to a released state, and the control unit being configured to switch a supply amount of lubricant from the first supply amount to a second supply amount which is smaller than the first supply amount when the release time counted by the release timer reaches the acquired delay time.

2. The brake device lubrication device according to claim 1, wherein
    the control unit is configured to store a previous braking time counted by the braking timer in the storage unit, and to use the previous braking time stored in the storage unit to correct a current braking time counted by the braking timer.

3. The brake device lubrication device according to claim 2, wherein
    the control unit is configured to set a value of the previous braking time stored in the storage unit to zero when the release time counted by the release counter exceeds a pre-set reference time.

4. A method for controlling a brake device lubrication device for supplying a lubricant to a brake device for cooling the brake device, the method comprising:
    counting a braking time, which is time elapsed from start of braking by the brake device;
    counting a release time, which is time elapsed from the start of releasing by the brake device;
    supplying a predetermined first supply amount of the lubricant to the brake device when the brake device is in a braking state;
    acquiring a delay time corresponding to the counted braking time from a relationship of correspondence between the delay time and the braking time stored in advance, when the brake device is switched from the braking state to a released state; and
    switching a supply amount of lubricant from the first supply amount to a second supply amount which is smaller than the first supply amount when the counted release time counted reaches the acquired delay time.

* * * * *